United States Patent [19]

Lehto et al.

[11] Patent Number: 4,928,530
[45] Date of Patent: May 29, 1990

[54] PRESSURE TRANSDUCER

[75] Inventors: Ari Lehto, Helsinki, Finland; Frank Chen, Broom Manor, United Kingdom

[73] Assignee: Vaisala Oy, Helsinki, Finland

[21] Appl. No.: 280,362

[22] Filed: Dec. 6, 1988

[30] Foreign Application Priority Data

Dec. 7, 1987 [FI] Finland .................................. 875387

[51] Int. Cl.$^5$ ............................................. G01L 9/00
[52] U.S. Cl. ........................................ 73/756; 73/115; 73/431
[58] Field of Search ................ 73/115, 756, 706, 708, 73/718, 720, 721, 724, 726, 727, 431; 338/4; 361/283

[56] References Cited

U.S. PATENT DOCUMENTS 4,325,260 4/1982 Takahashi et al. ..................... 73/756
4,507,707 3/1985 Willis .................................... 73/756

Primary Examiner—Donald O. Woodiel

[57] ABSTRACT

A pressure transducer comprises a sensor (16), an electronic circuitry part (17), a pressure connection (13), and an electrical connection (14). According to the invention, the transducer is constructed as a plug-in unit (5) and both the pressure connection and the electrical connection (14) are designed integral with the socket (6). The plug-in unit (5) may incorporate a splash-water protection (8) with a latch mechanism (9) for locking the plug-in unit (5) and the socket (6).

6 Claims, 1 Drawing Sheet

PRESSURE TRANSDUCER

BACKGROUND OF THE INVENTION

The present invention relates to a pressure transducer comprising a box-like socket and a plug-in unit.

The described transducer is intended for measuring pressures in non-ambient-pressure systems of vehicles, for example. This kind of a pressure system is, e.g., the pressure of the suction manifold in a car motor.

A construction known in the prior art is shown in FIG. 1. A pressure transducer is mounted to its base by lugs or similar fixtures 2. Pressure is applied via a hose to a connector 3 and electrical connection is via a connector 4.

The disadvantages of the illustrated construction are as follows: When the transducer is desired to be dismounted, the fixing screws must be removed as well as the electrical connector and the hose must be detached. These work phases must be repeated when reinstalling the transducer.

SUMMARY OF THE INVENTION

The aim of the present invention is to overcome the drawbacks of the aforementioned prior art technology and to provide a completely novel type of pressure transducer. This goal has been achieved by a pressure transducer in accordance with the invention.

The construction in accordance with the invention offers significant benefits. Thus, for example, installation work phases required in the conventional technology become unnecessary, since the transducer can be detached and mounted in a single action.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention will be examined in more detail by means of the exemplifying embodiments in accordance with the attached drawings which are given by way of illustration only, and thus are not limitative of the present invention, and wherein:

FIG. 2 shows in a perspective view the electronic circuitry placed on a substrate 1a;

DETAILED DESCRIPTION OF THE PREFERRED EMBODIMENTS

Figure 1:
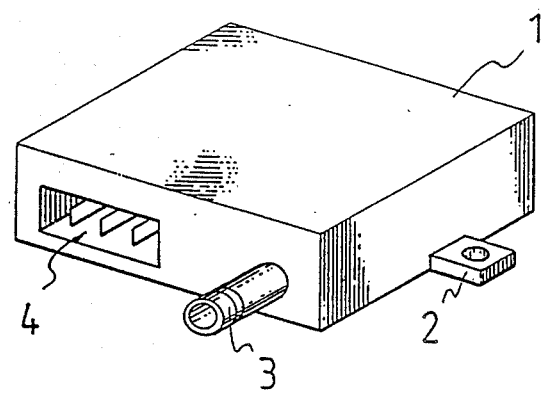
FIG. 1 shows a known pressure transducer.

The transducer according to the invention is comprised of two parts, which together form a entity. The first part is an plug-in unit 5, which contains a pressure sensor 16 and electronic circuitry 17, while the second part is a socket 6 of the transducer. The transducer is characterized by having both the pressure transducer and the electrical connectors combined in the socket 6, while the plug-in unit 5 is connected to the pressure source and electric supply via the socket 6. The socket 6 is factory-assembled in place and attached to the pressure source via a hose. The electrical connectors are attached to a wiring harness 7 and snapped in place into the socket 6. There is no need for dismounting the socket 6 after the initial installation. The plug-in construction used provides an additional benefit by allowing, is the case of suspected malfunction, a quick disconnection of the unit 5 and checking by means of a test device provided with a compatible socket 6.

Figure 2:
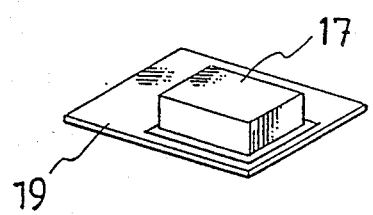
Figure 3:
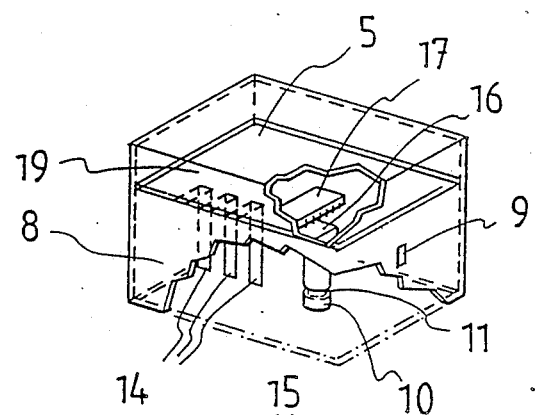
FIG. 3 shows a partially sectioned perspective view of the plug-in unit of a pressure transducer in accordance with the invention together with its splash-water protection.
Figure 4:
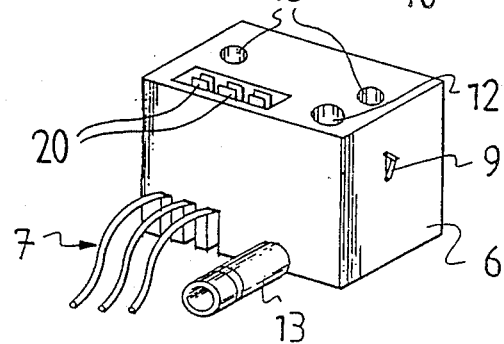
FIG. 4 shows in a perspective view the entire socket of the pressure transducer.

Furthermore, illustrated in FIGS. 2 . . . 4 is a splash-water protection for the pressure sensor. The protection comprises a sheath 8, into which the socket 6 is partially inserted. In FIG. 3, the sheath 8 is partially sectioned only in the interest of clarifying the details of the construction. The unit 5 and the socket 6 are locked to each other by means of a latch 9, which is comprised of, e.g., a protrusion 9'in the socket 6 and a corresponding hole in the sheath 8. Evidently, other types of locking mechanisms are conceivable. The pressure connection between the unit 5 and the socket 6 comprises a tube 10, which is preferably sealed using an O-ring mounted in, e.g., a groove 11. Alternatively, the O-ring may be mounted on the tube 12. Compatibility with the tube 10 is provided on the side of the socket 6 by a hole 12, which communicates with a tube 13. There may be two or more electrical connectors or second electrical connection means 14 with a round or flat section. These connectors 14 are received in a first internal connection means 20. The socket 6 is mounted on its base by, e.g., screws inserted through holes 15. The pressure hose is attached to the tube 13.

The electronic circuitry part 17 of the plug-in unit 5 is placed in the upper compartment of the unit. Hybrid technology may be used to construct the electronics onto, e.g., an alumina substrate 19. The sectioned area in FIG. 3 illustrates a sensor chip 16 and part of the electronic circuitry 17. Electromagnetic compatibility may be improved by mounting a cup 18 to the hybrid construction as seen in FIG. 2. The cup 18 can be fabricated from a thin metal sheet, for example. Typical dimensions for the socket 6 and the plug-in unit 5 are $3 \times 3 \times 4$ (height) cm$^3$.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A pressure transducer comprising:
(a) a box-like socket having
an upper side,
an external pressure connection,
first internal pressure connection means at the upper side and being connected to the external pressure connection,
external electrical conductors, and
first internal electrical connection means at the side and being connected to the conductors; and
(b) a plug-in unit having
a box-like splash-water protection sheath open at one side thereof, said sheath having internal dimensions at least approximately corresponding to external dimensions of the box-like socket, an electronic circuitry port provided inside the sheath,
second internal pressure connection means, and
second internal electrical connection means,
the sheath of the plug-in unit being placed over the box-like socket to encase the socket from above and from the sides thereof, the second internal pressure connection means being received in the first internal pressure connection means and the second electrical connection means being received in the first electrical connection means when the sheath is over the plug-in unit.

2. The pressure transducer as claimed in claim 1, further comprising a latch mechanism cooperated with the sheath and positioned between the plug-in unit and the socket when the sheath is over the plug-in unit.

3. The pressure transducer as claimed in claim 1, wherein the socket incorporates a splash-water protection.

4. The pressure transducer as claimed in claim 3, further comprising a latch mechanism cooperating with the splash-water protection of the socket and positioned between the plug-in unit and the socket when the sheath is over the plug-in unit.

5. The pressure transducer as claimed in claim 1, wherein the second internal pressure connection means is sealed with the first internal pressure connection means by an O-ring.

6. The pressure transducer as claimed in claim 1, wherein the socket is mountable onto its base by screws.

* * * * *